(12) United States Patent
Smolders et al.

(10) Patent No.: US 7,721,831 B2
(45) Date of Patent: May 25, 2010

(54) CONSTRUCTION MACHINERY AND PIVOTING DEVICE

(75) Inventors: Raymond Smolders, Herentals (BE); Holger Thieme, Vettelschoss (DE); Günter Tewes, Unkel/Rhein (DE)

(73) Assignee: Wirtgen GmbH (DE)

( * ) Notice: Subject to any disclaimer, the term of this patent is extended or adjusted under 35 U.S.C. 154(b) by 163 days.

(21) Appl. No.: 11/795,863

(22) PCT Filed: Jan. 26, 2006

(86) PCT No.: PCT/EP2006/050478

§ 371 (c)(1),
(2), (4) Date: Jul. 24, 2007

(87) PCT Pub. No.: WO2006/079652

PCT Pub. Date: Aug. 3, 2006

(65) Prior Publication Data
US 2008/0093149 A1  Apr. 24, 2008

(30) Foreign Application Priority Data
Jan. 26, 2005  (DE) ........................ 10 2005 003 739

(51) Int. Cl.
*B62D 11/04* (2006.01)
(52) U.S. Cl. .................................................. 180/9.46
(58) Field of Classification Search ................ 180/9.46, 180/411
See application file for complete search history.

(56) References Cited
U.S. PATENT DOCUMENTS

| 3,490,555 | A | * | 1/1970 | Bautzen et al. ............. 180/411 |
| 3,664,448 | A | * | 5/1972 | Hudis ........................ 180/9.46 |
| 3,710,695 | A | * | 1/1973 | Miller et al. .................. 404/98 |
| 4,029,165 | A | | 6/1977 | Miller |
| 4,558,758 | A | | 12/1985 | Littman et al. |
| 4,823,899 | A | * | 4/1989 | Ron ............................ 180/411 |
| 4,880,124 | A | | 11/1989 | Feider et al. |
| 6,675,927 | B1 | * | 1/2004 | Enmeiji et al. .............. 180/411 |

FOREIGN PATENT DOCUMENTS

| DE | 100 27 083 A1 | 1/2002 |
| GB | 2 275 662 A | 9/1994 |
| GB | 2 362 863 A | 12/2001 |

* cited by examiner

*Primary Examiner*—Kevin Hurley
(74) *Attorney, Agent, or Firm*—Waddey & Patterson, P.C.; Lucian Wayne Beavers

(57) ABSTRACT

A construction machine (1) with a machine frame (2) and lifting columns (8) carrying crawler track units (4). The lifting columns (8) include consoles (10) coupled in pairs to the machine frame (2) by articulations (20, 22, 24, 26) and a coupling rod (18). The mutual distance of the articulations (20, 24; 22, 26) on a console (10) is of a length and/or the coupling rod (18) is of a shape that, when the crawler track units (4) swivel between limit positions of a swivel gear (14), the coupling rod (18) maintains a distance to the articulations (20, 22) facing the machine frame and/or to the lifting columns (8) over a swivelling angle range in excess of 90°, starting from the working position. The swivel gear (14) effects both the steering and the swivelling movements respectively in and from a transport position (5) to the working position and back.

22 Claims, 6 Drawing Sheets

CONSTRUCTION MACHINERY AND PIVOTING DEVICE

BACKGROUND OF THE INVENTION

The invention relates to construction machinery, as well as a pivoting device.

Such construction machinery is known, for instance, from U.S. Pat. No. 4,029,165. In such construction machinery, the machine frame is supported by a chassis with several wheels or crawler track units that are coupled with the machine frame via lifting columns. The lower part of the lifting column is extendable in order to raise the machine frame to a pre-determined plane. Each lifting column can be adjusted in height individually or together with other lifting columns. The machine frame shows a width that is suitable for transport on a transport vehicle. In longitudinal direction, the machine frame shows a length that is a multiple of the width. As used herein, when it is said that one structure "shows" a certain feature, it is meant that the structure includes that feature.

In the known construction machine, the swivel support of each crawler track unit is mounted coaxially below one lifting column, with a slewing ring being arranged at the crawler track unit that enables steering of the crawler track unit by means of a steering cylinder which supports itself at the machine frame. Several articulated brackets are provided at the slewing ring which make it possible, by way of remounting the steering cylinder to other articulated brackets, to swivel a crawler track unit from a transport position parallel to the longitudinal direction of the machine frame to a working position transverse to the longitudinal direction in several work steps.

In transport position, the construction machine is capable of being driven from a transport vehicle and of being steered, whereas in working position, the machine is capable of bridging a carriageway width of up to, for instance, 18 m depending on the length of the machine frame.

Of disadvantage in this design are the great installation effort required on all crawler track units and the risk of accident and injury during the installation work.

The installation effort is caused by the fact that the steering cylinder is suitable for enabling a swivelling angle of approx. 45° only. Additional articulated brackets must therefore be provided at the slewing ring in order to enable the steering cylinder to be remounted for further swivelling of the crawler track unit and to enable it to be coupled to a different articulated bracket. In the process, it causes difficulty to bring the piston rod of the steering cylinder into an aligned position with a different articulated bracket at the slewing ring for the purpose of articulated locking.

In a different embodiment without additional articulated brackets, a coupling rod enables the steering function of the crawler track unit in transport position to be transmitted to the crawler track unit arranged on the other side of the machine frame.

SUMMARY OF THE INVENTION

The purpose of the invention is to further develop a construction machine of the type mentioned at the start, as well as a pivoting device, in such a manner that both the steering movement in transport position and the swivelling movement from transport position to working position and vice versa can be effected by way of a swivel gear without requiring any remounting work.

The invention provides in an advantageous manner that the consoles of two adjacent lifting columns are coupled, by way of spaced articulations each, with the machine frame on the one hand and with a coupling rod on the other hand. The mutual distance of the articulations on a console of a lifting column is of such a length as to enable the console with the wheel or crawler track unit to be swivelled in excess of 90°. Alternatively, the coupling rod may not run in a straight line between the articulations facing the coupling rod but may, for instance, be shaped in a horizontal plane in such a manner that the collision-free maximum swivelling angle is increased. The distance of the articulations or the shape of the coupling rod respectively are such that, when swivelling and in particular in the limit positions of the swivel gear, the coupling rod maintains a distance to the articulations facing the machine frame and/or to the lifting columns over a swivelling range in excess of 90°, starting from the working position. Both the steering movement in transport position and the swivelling movement from transport position to working position and back are effected by the swivel gear. The invention enables the wheels or crawler track units of a construction machine to be transferred from a working position to a transport position and vice versa and to steer the wheels or crawler track units in transport position without requiring remounting or installation work.

Since the installation work is dispensed with, the time required for re-setting the machine from working position to transport position and vice versa is reduced considerably, and the accident hazards resulting from the installation work are eliminated.

The consoles of the wheels or crawler track units may be attached to the fixed upper part of the lifting column in a non-rotatable manner. The arrangement of the consoles at the upper part of the lifting columns offers the advantage that the swivel gear can be arranged at a large distance from the ground surface so as not to be soiled by the ground or the material to be processed. The operational safety of the pivoting device is thus increased.

As seen in FIG. 2 each of the consoles provided at the lifting columns accommodates two articulations that show a pre-determined identical horizontal distance 100 and 102 to one another. The identical centre-to-centre distance of the articulations enables the consoles to be guided in a parallelogram-type manner.

The swivel gear has a maximum swivelling angle in excess of 90° and up to 120°, preferably 105°, starting from the working position. This means that the swivel gear is capable of initially swivelling the wheel or crawler track unit by 90°, starting from the working position, until the transport position has been reached, and then further to, for instance, maximum 120° for the purpose of setting a steering angle of +/−30° relative to the direction of travel.

When doing so, the swivel gear has a steering angle in transport position of +15° to +30° to one side until a maximum total swivelling angle of 105° to 120° has been reached. It is understood that in the opposite direction, towards the working position, the steering angle is not limited but can be set to up to −90° (working position).

The manoeuverability of the construction machine in transport position is improved especially due to the fact that the front or rear crawler track units in transport position are capable of being swivelled in the same or alternatively in the opposite swivelling direction. According to a further alternative, the rear crawler track units may remain in the working position while the front crawler track units only are in transport position with or without the steering angle deviating from 0°.

The articulations facing the machine frame are arranged in crossbeams of the machine frame, the said crossbeams running parallel to the direction of travel when in working position. The coupling rod runs essentially parallel to the corresponding crossbeam of the machine frame and transverse to the direction of travel when in transport position.

A preferred embodiment provides that several consoles are provided at each lifting column with a mutual vertical distance, the said consoles accommodating between them the coupling rod and/or a drive unit for the swivel gear in an articulated manner. The multiple arrangement of the consoles enables the coupling rod and the drive for the swivel gear to be mounted in a rigid manner, with the said drive preferably consisting of a piston cylinder unit.

The lower, extendable part of the lifting columns is preferably arranged in a non-rotatable manner relative to the upper part of the lifting columns. This can be achieved, for instance, by means of a square cross-sectional shape or else by a sliding block that runs in grooves between the two parts of the lifting column. Such a lifting column increases the driving stability and in particular the track precision of the construction machine.

As seen in FIG. 1 the vertical axes 104 and 106 of the adjacent lifting columns when seen in transverse direction of the machine frame show identical distances, in opposite directions, relative to the axes 108 and 110 of the corresponding articulations of the console that face the machine frame. The distance of the vertical axes of the lifting columns is thus increased, in particular in the working position, which provides the machine with increased stability when in the working position.

When in working position, the vertical axes 104 and 106 of the adjacent lifting columns when seen in the direction of travel may differ in distance from the axes 112 and 114 of the corresponding articulations 24 and 26 facing the coupling rod. In this way, the coupling rod may be arranged in a parallelogram-type manner, thus enabling the swivel gear to effect a steering movement when in transport position.

It may also be provided in an alternative embodiment that the vertical axis of the lifting columns is coaxial to the axis of the corresponding articulation facing the machine frame. This can be achieved, for instance, by the crossbeam of the machine frame enclosing the lifting column while forming a swivel joint. The cross-section of the lifting column then has a preferably circular shape.

The running direction of the wheels or crawler track units respectively is maintained while swivelling the wheels or crawler track units from transport position into working position and vice versa.

The construction machine preferably is a road construction machine, in particular a slipform paver or a texture curing machine.

In the following, embodiments of the invention are explained in more detail with reference to the drawings:

DETAILED DESCRIPTION OF THE INVENTION

Figure 1:
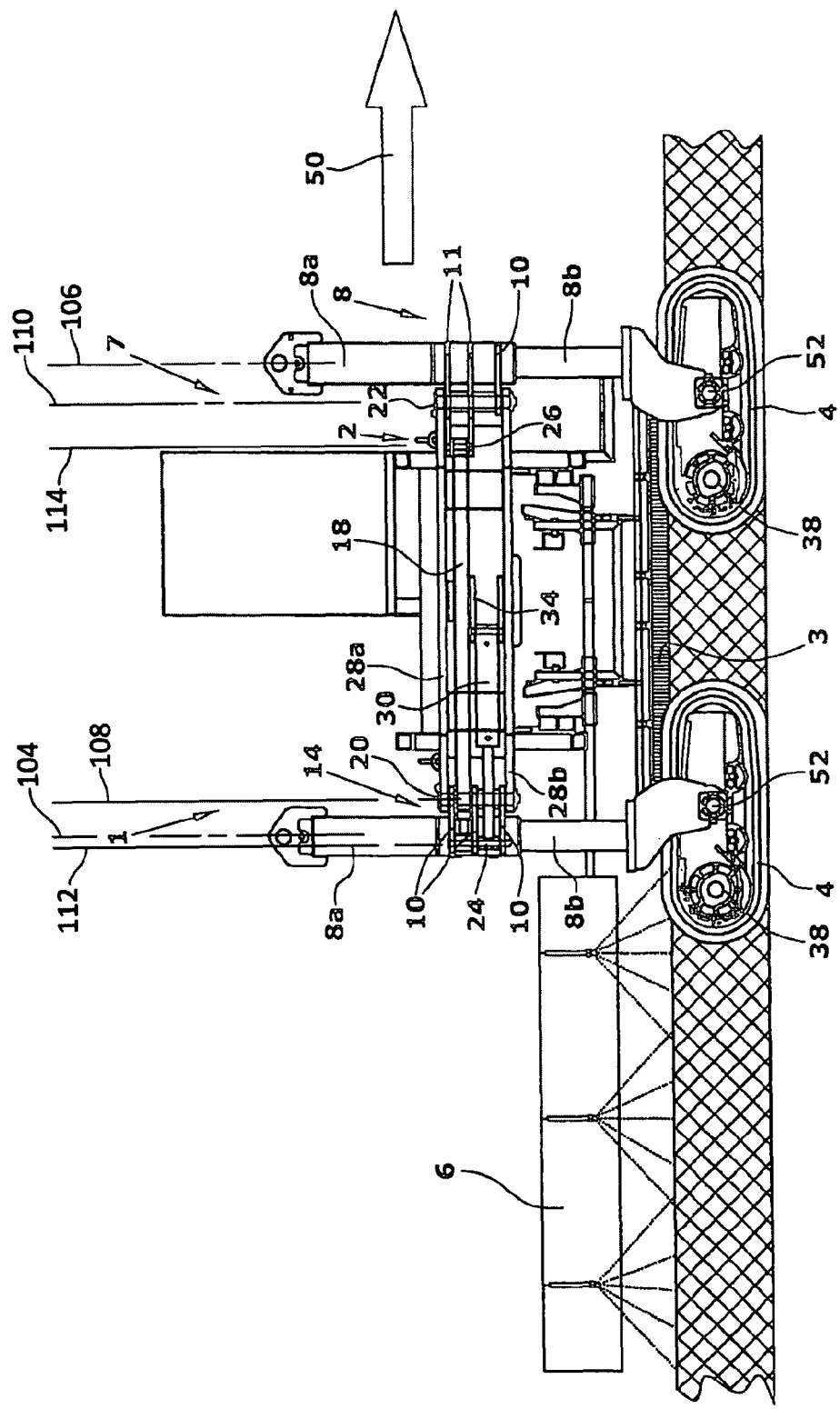
FIG. 1 is an embodiment of the invention in the form of a texture curing machine.

FIG. 1 shows a construction machine in the form of a texture curing machine that can be used for texturing a newly produced road surface by means of a texturing assembly 3 and for subsequently spraying the said road surface with a liquid curing agent by means of a spray system 6.

The machine frame 2 shows a width that is suitable for transport on a transport vehicle so that the machine can be transported to the job location by road on the transport vehicle. In longitudinal direction of the machine frame 2, the machine frame may show a length that is a multiple of the width by enabling, for instance, the insertion of widening elements or telescoping of the machine frame.

A carriageway width of, for instance, up to 18 m can thereby be bridged in the working position that is shown in FIG. 1. The direction of travel is indicated in the corresponding drawings by an arrow 50, 60.

The construction machine 1 shows a chassis with several ground engaging support units 4 which may be wheels and/or crawler track units 4 that support the machine frame 2 in a height-adjustable manner via lifting columns 8.

Figure 2:
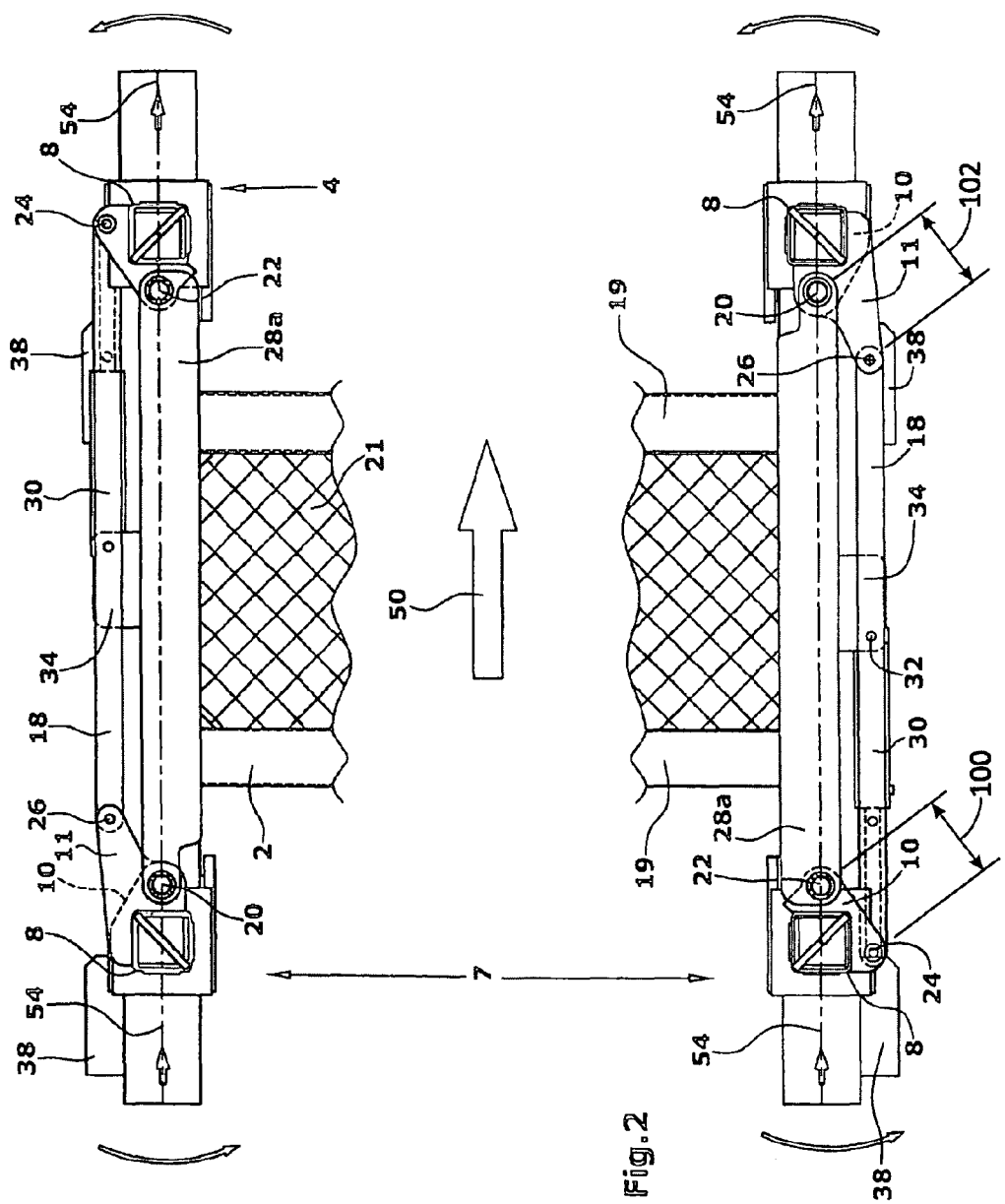
FIG. 2 is a top view of the machine frame of a construction machine in working position.

The wheels or crawler track units 4 can be transferred from a working position 7 as shown in FIG. 2 to a transport position 5 as shown in FIGS. 1 as well as 4 and 5 by means of a swivel gear 14. In the working position, as shown in FIGS. 1 and 2, the crawler track units 4 run parallel to crossbeams 28 of the machine frame 2. In the transport position, the crawler track units 4 run parallel to the longitudinal extension of the machine frame, namely, swivelled by 90° and transverse to the crossbeams 28. It is understood that such a design with a machine frame 2 supported by a chassis with lifting columns 8 is usable for a large number of construction machines, in particular road construction machines. The texture curing machine depicted in FIG. 1 is therefore merely one example of a possible usage. One important field of application are slipform pavers.

The swivel gear 14 used for swivelling the crawler track units 4 shown in the figures can effect both the swivelling movement from the working position to the transport position and vice versa, as well as the steering movement in transport position.

Figure 3:
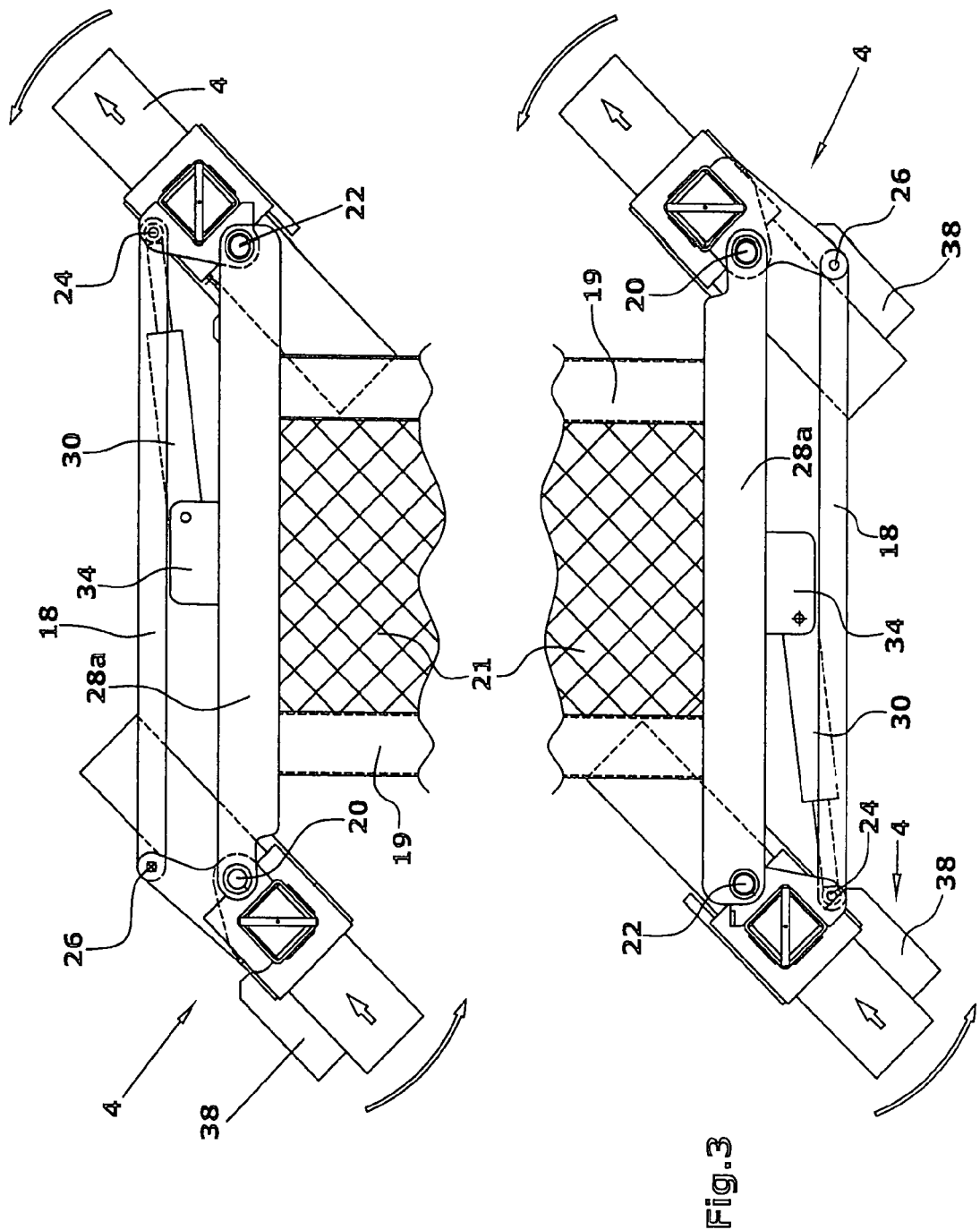
FIG. 3 is a construction machine in accordance with FIG. 2, where the crawler track units are in an intermediate position.

FIG. 3 shows an intermediate position of the crawler track units 4 in transition from the working position to the transport position.

Figure 4:
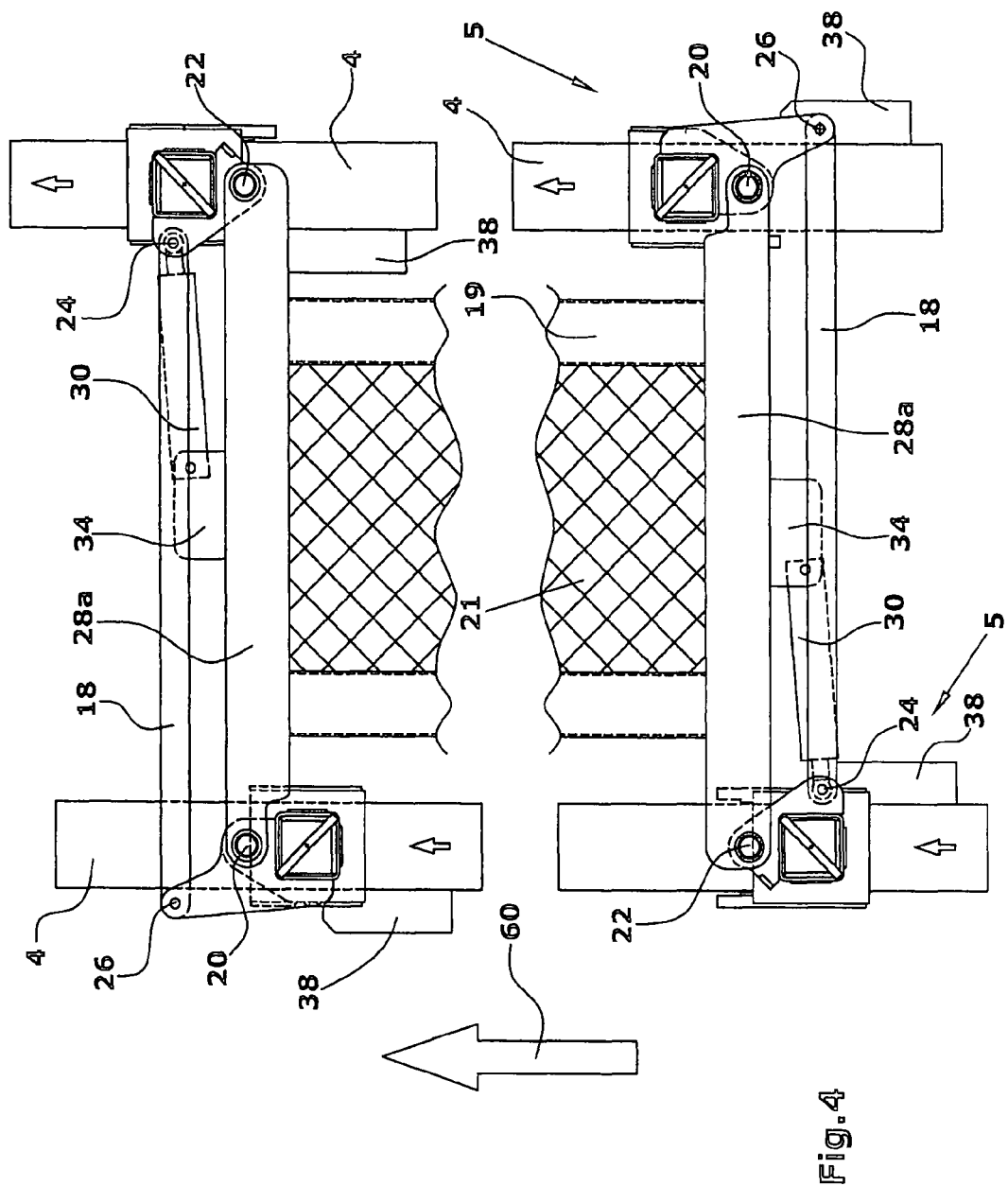
FIG. 4 is an illustration in accordance with FIGS. 2 and 3, where the crawler track units are in transport position.

The transport position depicted in FIG. 4 shows the space requirement for transporting the construction machine. The transport width is approx. 2.50 m.

Figure 5:
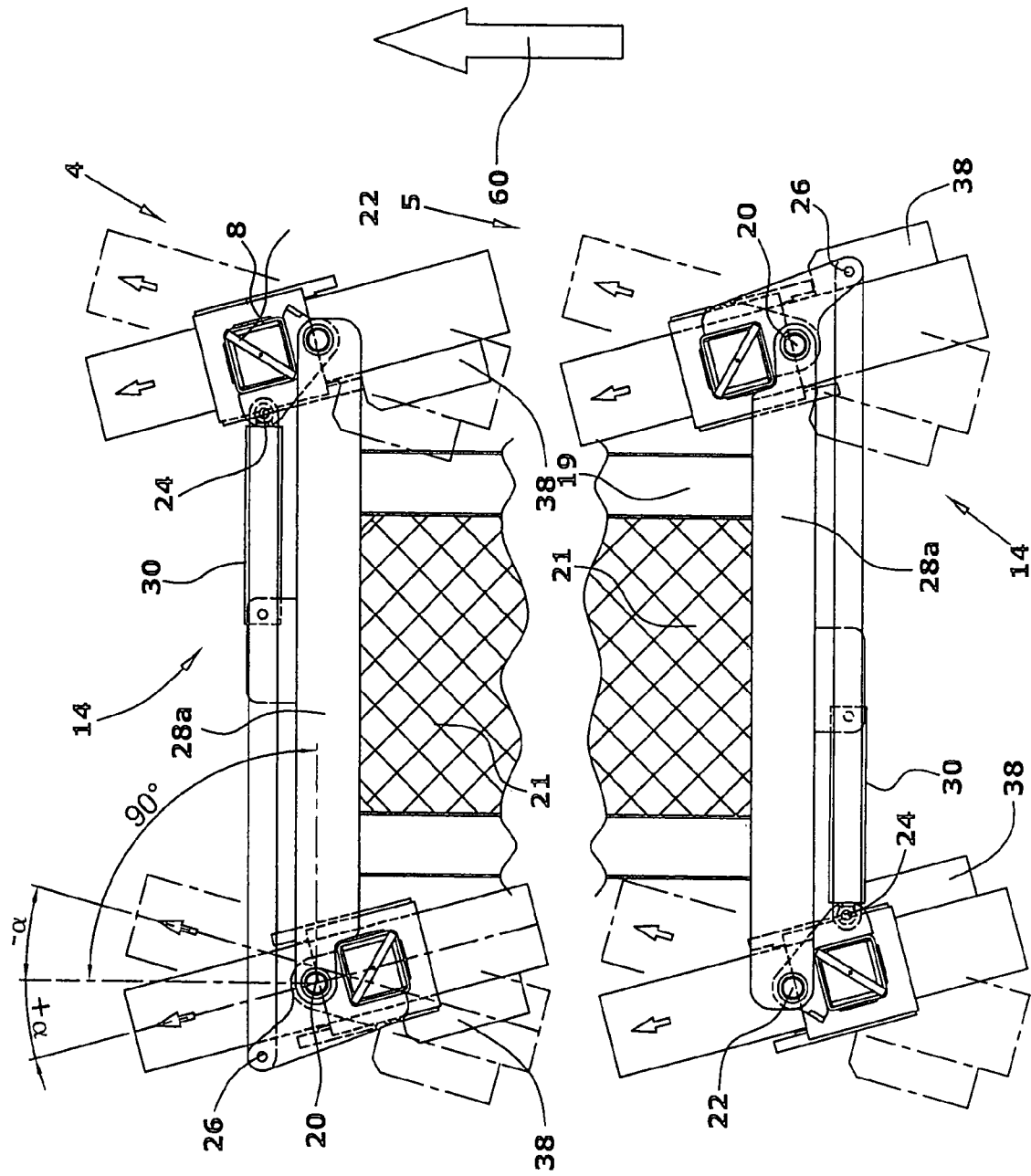
FIG. 5 is the achievable steering angle of the crawler track units in transport position.

The steering movement in transport position can be seen in FIG. 5 where, for instance, a steering angle of +/−a is specified.

As a swivel gear 14 is provided on both transverse sides of the machine frame 2, it is understood that the crawler track units 4 on the short sides of the machine frame 2 can be swivelled in the same direction and also in opposite directions for the purpose of steering in transport position. It is, in particular, also possible to also leave the rear crawler track units when seen in the direction of travel 60 in the working position.

The swivel gear 14, which is suitable for coupling to a machine frame 2, consists of the elements described in the following.

Consoles 10, 11 are attached in a non-rotatable manner to the upper parts 8a of the lifting columns 8 in the form of articulated carrier plates.

The consoles 10, 11 show two articulations each 20, 24; 22, 26 that are coupled on the one hand with the machine frame 2 and on the other hand with a coupling rod 18, where the said coupling rod 18 runs essentially parallel to crossbeams 28 of the machine frame 2.

The mutual distance of the articulations 20, 24 and 22, 26 is of such a length as to enable the consoles 10, 11 to be swivelled in excess of 90°. The coupling rod 18 and the differently designed consoles 10, 11 form a parallelogram guide of the crawler track units 4 in such a manner that, for instance, a drive unit 30 coupled to the articulation 24 facing the coupling rod can simultaneously swivel both adjacent crawler track units 4. The coupling rod may be adjustable with regard to its length for the purpose of adjusting the steering angles at the lifting columns coupled with the coupling rod.

Figure 6:
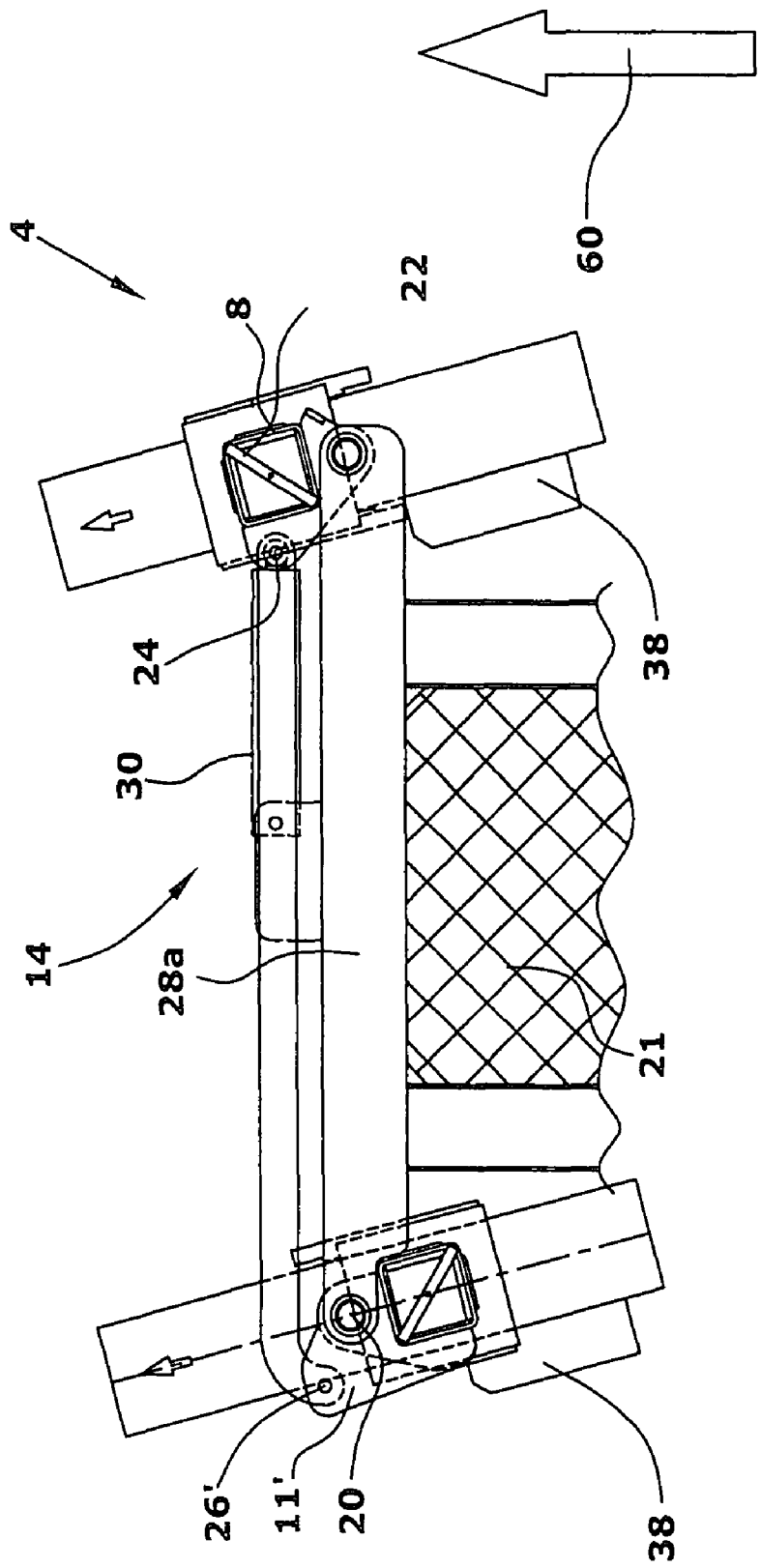
FIG. 6 is an alternative embodiment of FIG. 5.

Apart from choosing a sufficient mutual distance of the articulations on the consoles 10, 11, a collision-free swivelling angle of 120° can also be achieved in that the coupling rod 18 does not run in a straight line between the articulations 24, 26 facing the coupling rod in, for instance, a horizontal plane but is, for instance, bent or angular as can be seen, for instance, in FIG. 6 where a modified console 11' is depicted which shows an articulation 26' that is arranged closer to the articulation 24. It is basically also possible to use a coupling rod that does not run in a straight line in the vertical plane. It is ultimately important that, when swivelling the crawler track units 4 and in particular in the limit positions of the swivel gear 14, the coupling rod 18 maintains a distance to the articulations 20, 22 facing the machine frame and/or to the lifting columns 8 over a swivelling range in excess of 90°, starting from the working position.

Irrespective of the different designs of the consoles 10 and 11, the articulations 20, 22 facing the machine frame have an identical distance to the articulations 24, 26 facing the coupling rod.

Of importance is also the distance of the lifting columns 8 from the articulations 20, 22 facing the machine frame. A larger distance can increase the collision-free maximum swivelling angle. Recesses at the crossbeams 28a, 28b can additionally increase the maximum swivelling angle by accommodating the lifting columns 8.

As explained previously and as can be seen from FIG. 5, the full swivelling range of the swivel gear 14 extends to a maximum swivelling angle of 120°, preferably 105°. In this way, steering is possible also in the transport position 5 of the crawler track units 4, as shown in FIG. 5, when actuating the same drive unit 30 via the swivel gear 14. The crossbeams 28a, b of the machine frame 2 are shown in the drawings as articulated points for the articulations 20, 22 facing the machine frame. It is understood that the articulations 20, 22 facing the machine frame may also be articulated at other points of the machine frame.

The drive unit 30, which may also be referred to as a pivoting device 30, preferably consists of a piston cylinder unit, where the piston rod is coupled with the articulation 24. The cylinder is articulated at the machine frame 2, for instance, at a connecting flange 34 projecting from the crossbeams 28a, b, in an articulated manner via an articulation 32. The piston cylinder unit runs in the limit positions of the swivel gear, as they can be seen in FIGS. 2 and 4, essentially parallel to the crossbeams 28a, 28b and/or the coupling rod 18.

The lifting columns 8 have a square cross-section so that the lower part 8b is secured against twisting vis-à-vis the upper part 8a of the lifting column 8. It is understood that the lifting columns 8 may also have a circular cross-section that is secured against twisting by some other means.

Furthermore, a step-on platform 21 can be seen in FIG. 2 that is limited by longitudinal beams 19 that are extendable or telescopable, if necessary.

It can be seen from FIG. 1 that several of the consoles 10, 11 may be arranged in a fixed manner above one another at the upper part of the lifting column 8, where it can be discerned with regard to the consoles 10, which are arranged at a vertical distance to one another, that the coupling rod 18 is articulated with one end at the articulation 24 between the two upper consoles 10 and that the piston rod of the drive unit 30 is coupled to the articulation 24 between the two lower consoles 10. In this way, the articulation 24 extends vertically across all three of the consoles 10.

Only two consoles 11 are provided at the adjacent lifting column 8, the said consoles 11 accommodating between them the other end of the coupling rod 18 at the articulation 26. A further console in the shape of the consoles 10 is arranged below the consoles 11 which, together with the consoles 11 and the crossbeams 28a, 28b, accommodates the articulation 22.

The crossbeam 28 consists of an upper part 28a and a lower part 28b which runs parallel to it at a vertical distance, with the articulations 20, 22 extending through their corresponding ends.

The hydraulic drives 38 of the crawler track units are arranged in such a manner that the lower return side of the track chain is subject to tensile stress. The running direction of the crawler track units 4 is maintained during swivelling so that remounting work relating to the rotating direction of the hydraulic drive motors is not required.

It is preferably provided that the axes of the articulations 20, 22 intersect the weight-loaded horizontal axis 52 of the crawler track unit 4. As can be seen in FIG. 2, the axis of the articulations 20, 22 may additionally also intersect the longitudinal centre line of the crawler track units 4. Swivelling of the crawler track units 4 can thus be achieved with greater ease.

When the crawler track units 4 are in working position, steering in accordance with the course of the road can be achieved by different propulsion of the crawler track units 4 that are arranged on both sides of the road.

Although a preferred embodiment of the invention has been specifically illustrated and described herein, it is to be understood that minor variations may be made in the apparatus without departing from the spirit and scope of the invention, as defined by the appended claims.

We claim:

1. Construction machine
   with a machine frame including a width that is suitable for transport on a transport vehicle, as well as a length in the longitudinal direction of the machine frame that is a multiple of the width,
   with a chassis with several ground engaging support units that support the machine frame via lifting columns, in which the ground engaging support units are capable of being swivelled from a working position transverse to the longitudinal direction of the machine frame to a transport position parallel to the longitudinal direction, and are capable of being steered in the transport position by way of a swivel gear that acts upon the ground engaging support units,
   characterized in that,
   the lifting columns include consoles,
   the consoles of two adjacent lifting columns are coupled, by way of articulations, with the machine frame and with a coupling rod, where the distance between the articulations on each console is of such a length and/or the coupling rod includes such a shape that, when swivelling and in the limit positions of the swivel gear, the coupling rod maintains a distance to the articulations on the machine frame and/or to the lifting columns over a swivelling angle range in excess of 90°, starting from the working position, and the swivel gear effects both the steering movement in the transport position, as well as the swivelling movement from the transport position to the working position and back.

2. The construction machine in accordance with claim 1, characterized in that the consoles of the ground engaging support units are attached to an upper part of the lifting column in a non-rotatable manner.

3. The construction machine in accordance with claim 1, characterized in that each console includes two articulations which maintain a pre-determined identical distance to one another.

4. The construction machine in accordance with claim 1, characterized in that the maximum swivelling angle of the swivel gear is in the range of 105° to 120°, starting from the working position.

5. The construction machine in accordance with claim 1, characterized in that the steering angle of the swivel gear is −90° to the one side and from 0° to +30° to the other side, starting in the transport position.

6. The construction machine in accordance with claim 1, characterized in that the articulations on the machine frame are arranged in crossbeams of the machine frame and that the coupling rod runs parallel to a crossbeam of the machine frame.

7. The construction machine in accordance with claim 1, characterized in that several consoles are provided at each lifting column with a vertical distance between the consoles, the said consoles accommodating between them the coupling rod and/or a drive unit for the swivel gear.

8. The construction machine in accordance with claim 1, characterized in that a lower, extendable part of a lifting column is arranged in a non-rotatable manner relative to an upper part of the lifting column.

9. The construction machine in accordance with claim 1, characterized in that each lifting column has a vertical axis and each articulation on the machine frame has a vertical axis, and the vertical axes of the adjacent lifting columns are spaced identical distances, in opposite directions, relative to the axes of the closest articulations of the console on the machine frame.

10. The construction machine in accordance with claim 1, characterized in that each lifting column has a vertical axis and each articulation on the coupling rods has a vertical axis, and the vertical axes of the adjacent lifting columns differ in distance from the axes of the closest articulations on the coupling rod.

11. The construction machine in accordance with claim 1, characterized in that the running direction of the ground engaging support units is maintained while swivelling the ground engaging support units from the transport position to the working position and vice versa.

12. The construction machine in accordance with claim 1, characterized in that the construction machine is a slipform paver or a texture curing machine.

13. The construction machine in accordance with claim 1 including a pivoting device for the ground engaging support units, the pivoting device coupled with the machine frame of the construction machine, where the ground engaging support units are transferable from a working position to a transport position that is offset by 90° and are steerable in the transport position, characterized in that, the consoles are part of the swivel gear.

14. The construction machine in accordance with claim 2, characterized in that each console includes two articulations which maintain a pre-determined identical distance to one another.

15. A construction machine apparatus, comprising:

a machine frame including a width and a length greater than the width;

a plurality of ground engaging supports;

a plurality of lifting columns, each lifting column supporting the frame from one of the ground engaging supports;

a coupling rod;

each lifting column having a console fixed thereto; and the consoles of two adjacent lifting columns each being pivotally connected at a first pivotal connection to the machine frame and at a second pivotal connection to the coupling rod, the distances between the first and second pivotal connections of each console, and the shape of the coupling rod being such that the ground engaging supports can be swiveled over a swiveling angle range in excess of 90° starting at a working position wherein the ground engaging supports are oriented parallel to the width of the machine frame, and extending past a transport position wherein the ground engaging supports are oriented parallel to the length of the machine frame, the coupling rod maintaining a spacing from the pivotal connections on the machine frame and from the lifting columns throughout the swiveling angle range.

16. The apparatus of claim 15, wherein:

the first and second pivotal connections of both consoles are spaced apart by an equal distance.

17. The apparatus of claim 15, wherein:

the swiveling angle range extends to a maximum of from 105° to 120°.

18. The apparatus of claim 15, wherein:

the machine frame includes crossbeams oriented parallel to the width of the machine frame;

the pivotal connections of the consoles to the machine frame are located on one of the crossbeams; and the coupling rod extends parallel to the one crossbeam.

19. The apparatus of claim 15, wherein:

each lifting column has a vertical axis;

each pivotal connection between the consoles and the machine frame has a vertical axis; and the vertical axes of the two adjacent lifting columns are equally spaced in opposite directions from the vertical axes of the pivotal connections of the machine frame to the respective consoles fixed to the lifting columns.

20. The apparatus of claim 19, wherein:

each pivotal connection between the consoles and the coupling rod has a vertical axis; and the console fixed to one of the lifting columns has a greater distance between its associated lifting column vertical axis and the vertical axis of its associated pivotal connection to the coupling rod than does the console fixed to the other of the two adjacent lifting columns.

21. The apparatus of claim 15, wherein the coupling rod is a straight coupling rod.

22. The apparatus of claim 15, wherein the coupling rod has a bent shape.

* * * * *